United States Patent
Klingbeil et al.

(10) Patent No.: US 11,821,375 B2
(45) Date of Patent: Nov. 21, 2023

(54) METHODS AND SYSTEMS FOR SKIP FIRE IN A MULTI FUEL ENGINE

(71) Applicant: Transportation IP Holdings, LLC, Norwalk, CT (US)

(72) Inventors: Adam Edgar Klingbeil, Ballston Lake, NY (US); Thomas Michael Lavertu, Ballston Lake, NY (US); Eric Dillen, Edinboro, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 17/457,870

(22) Filed: Dec. 6, 2021

(65) Prior Publication Data

US 2023/0175446 A1   Jun. 8, 2023

(51) Int. Cl.
*F02D 19/02*   (2006.01)
*F02D 41/00*   (2006.01)

(52) U.S. Cl.
CPC ....... *F02D 19/021* (2013.01); *F02D 41/0047* (2013.01); *F02D 41/0087* (2013.01); *F02D 2200/021* (2013.01); *F02D 2200/101* (2013.01)

(58) Field of Classification Search
CPC .............. F02D 19/021; F02D 41/0047; F02D 41/0087; F02D 2200/021; F02D 2200/101
See application file for complete search history.

(56) References Cited

U.S. PATENT DOCUMENTS

| | | | |
|---|---|---|---|
| 2010/0050993 A1* | 3/2010 | Zhao | F02D 41/0087 123/481 |
| 2014/0352656 A1* | 12/2014 | Kolhouse | F02B 31/085 123/308 |
| 2016/0032859 A1* | 2/2016 | Klingbeil | F02P 15/02 123/406.19 |
| 2016/0252027 A1* | 9/2016 | Jackson | F02D 19/0694 60/605.2 |
| 2018/0223745 A1* | 8/2018 | Atterberry | F02D 41/0025 |
| 2019/0211755 A1* | 7/2019 | Doui | F02D 19/0623 |

FOREIGN PATENT DOCUMENTS

CA   2798599 A1 *   2/2013   ............. F02D 17/02

* cited by examiner

*Primary Examiner* — George C Jin
(74) *Attorney, Agent, or Firm* — McCoy Russell LLP

(57) ABSTRACT

Various methods and systems are provided for skipping fire in one or more cylinders in a dual fuel engine. In one example, a method may include injecting a combination of two fuels to a first set of cylinders of the engine while disabling fuel injection to all remaining cylinders of the engine.

20 Claims, 5 Drawing Sheets

METHODS AND SYSTEMS FOR SKIP FIRE IN A MULTI FUEL ENGINE

BACKGROUND

Technical Field

Embodiments of the subject matter disclosed herein relate to a multi fuel engine system and more specifically, to a method to selectively skip fire in one or more cylinders.

Discussion of Art

Vehicles, such as rail vehicles and other off-highway vehicles, may utilize a dual fuel or multi fuel engine system for propulsion. The dual fuel engine system may allow vehicle navigation to be driven by torque produced through combustion of more than one type of fuel at an engine. In some examples, the more than one type of fuel may include hydrogen and diesel. A substitution rate of the fuel may be adjusted to adjust engine power output, emissions, engine temperature, and so forth. Combustion parameters may vary according to a ratio of hydrogen to diesel injected at the engine due to different physical properties of the fuels. For example, hydrogen may have a higher energy density, lower ignition energy, and wider range of flammability than diesel. As such, engine efficiency, power output, and emissions may be affected by co-combustion of hydrogen and diesel.

BRIEF DESCRIPTION

In one embodiment, a method for an engine in a vehicle may include injecting a combination of two fuels to a first set of cylinders of the engine while disabling fuel injection to all remaining cylinders of the engine.

In this way, by skipping combustion in one or more cylinders of a dual fuel engine during low load or idling conditions, fuel burning may be improved, and engine efficiency may increase. The two fuels may include diesel and hydrogen, and the combination of the two fuels may be ignited via compression ignition. The injecting of the combination of two fuels to the first set of cylinders of the engine may be carried out in response to one of a lower than threshold engine load, an engine idling, and a lower than threshold engine fueling demand. A number of cylinders in the first set of cylinders where combustion is continued and a ratio of hydrogen to diesel may be selected based on one or more of an engine load, an engine speed, an engine temperature, and an engine dilution demand. The number of cylinders in the first set may be decreased with a decrease in one or more of the engine load, the engine speed, and the engine temperature.

DETAILED DESCRIPTION

Figure 1:
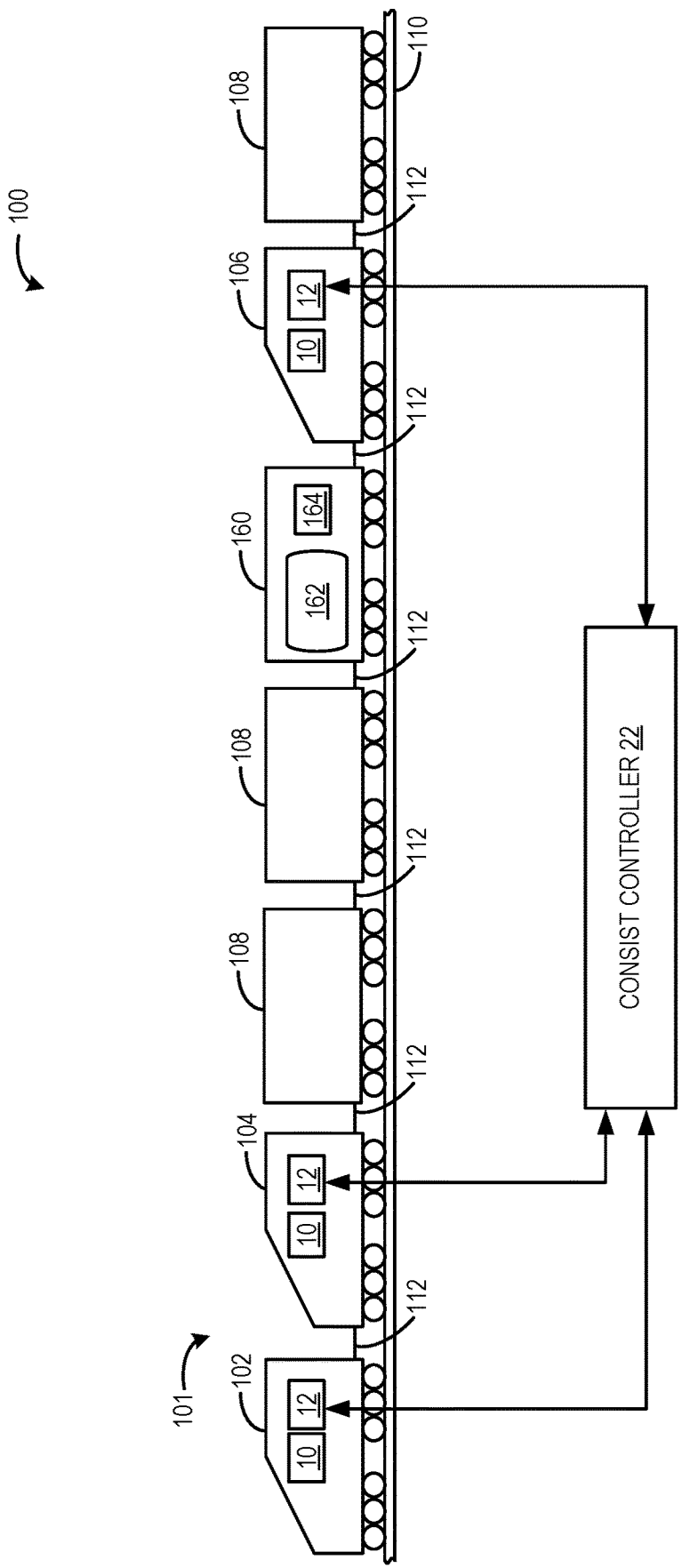
FIG. 1 shows an example embodiment of a train including a rail vehicle consist.

The following description relates to a system and methods for selectively skipping combustion in one or more cylinders in a dual fuel engine system. In one example, during certain engine operating conditions including a lower than threshold engine load, engine idling, and a lower than threshold engine temperature being met, fueling and combustion may be suspended in a group of cylinders while the remaining engine cylinders (referred herein as active cylinders) may be fueled using a mixture of hydrogen and diesel. Operating with some cylinders completing a cycle without combusting is referred here as "skip firing". In order to maintain desired engine speed during the skip fire operation, the amount of total fuel injected to all active cylinders may be controlled such that each individual cylinder receives a higher amount of fuel during skip fire than when more or all cylinders are firing during each combustion cycle. By doing so, the air fuel ratio in each cylinder may decrease, thereby improving combustion. A ratio of hydrogen to diesel in the fuel may be adjusted based on engine operating conditions, fuel levels, EGR demand, and geographical location. Which cylinders are the active cylinders may be altered such that all cylinders are cycled through being active and inactive.

In some embodiments, the engine is configured to be positioned in a vehicle, such as a rail vehicle. The above described configuration may be particularly advantageous in a rail vehicle due to the sustained periods of low load operation rail vehicles may undergo, for example sitting at idle mode during loading and unloading of cargo, idling in the yard, or other idle operation. Likewise, the operation described herein may be particularly useful during low load dynamic braking operation wherein braking energy is either electrically dissipated or stored in a battery system. "Low-load" operation may comprise a mode of operation of the engine where a relatively low amount of work is performed by the engine, for example, low-load operation may be less than 50% of engine load. Conversely, a "high-load" operation of the engine may comprise a mode of operation where a relatively higher amount of work is performed by the engine, for example operation at greater than 50% engine load.

In addition to rail vehicles, the approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, and other off-highway vehicles (OHV). On-road vehicles can include automobiles, buses, and semi-trucks. Off road vehicles can include mining equipment, marine vessels, rail vehicles, agricultural vehicles, and the like. For clarity of illustration, a locomotive is provided as an example of a mobile platform supporting a system incorporating an embodiment of the invention.

Before further discussion of the methods for skip firing in a dual fuel engine, an example platform in which the methods may be implemented is shown. FIG. 1 depicts an example train 100, including a plurality of rail vehicles 102, 104, 106, a fuel tender 160, and cars 108 that can run on track 110. The plurality of rail vehicles, the fuel tender, and the cars are coupled to each other through couplers 112. In one example, the plurality of rail vehicles may be rail vehicles (locomotives), including a lead locomotive 102 and one or more remote locomotives 104, 106. While the depicted example shows three locomotives, one fuel tender, and four cars, any appropriate number of locomotives, fuel tenders, and cars may be included in the train 100. Further, the locomotives in the train may form a consist. For example, in the embodiment depicted, the locomotives may form consist 101. Various vehicles may form vehicle groups (such as consists, convoys, swarms, fleets, platoons, and the like). The vehicles in a group may be coupled together mechanically and/or virtually.

In some examples, the consist may include successive locomotives, e.g., where the locomotives are arranged sequentially without cars positioned in between. In other examples, as illustrated in FIG. 1, the locomotives may be separated by one or more cars in a configuration enabling distributed power operation. In this configuration, throttle and braking commands may be relayed from the lead locomotive to the remote locomotives by a radio link or physical cable, for example.

The locomotives may be powered by engine 10, while the cars may be non-powered. In one example, the engine may be a dual fuel or multi fuel engine. For example, the engine may be configured to combust hydrogen and diesel, in varying ratios. Further details of the engine are provided further below, with reference to FIG. 2.

The train may further include a control system including at least one engine controller 12 and at least one consist controller 22. As depicted in FIG. 1, each locomotive includes one engine controller, all of which are in communication with the consist controller. The consist controller may be located on one vehicle of the train, such as the lead locomotive, or may be remotely located, for example, at a dispatch center. The consist controller is configured to receive information from, and transmit signals to, each of the locomotives of the consist. For example, the consist controller may receive signals from a variety of sensors on the train and adjust train operations accordingly. The consist controller is also coupled to each engine controller for adjusting engine operations of each locomotive. As elaborated with reference FIG. 5, each engine controller may determine an engine speed, an exhaust temperature, an engine fueling demand, and an engine load, and, in response to one of a lower than threshold engine load, an engine idling, and a lower than threshold engine fueling demand, may inject a combination of two fuels to a first set of cylinders of the engine while skipping fire (disabling fuel injection and combustion) in all remaining cylinders of the engine.

The train may include at least one fuel tender, which may be configured to carry one or more fuel storage tanks 162 and includes a controller 164. While the fuel tender is positioned in front of the remote locomotive 106, other examples may include alternate locations of the fuel tender along the train. For example, the fuel tender may be instead positioned behind the remote locomotive or between the lead locomotive and the remote locomotive.

Figure 2:
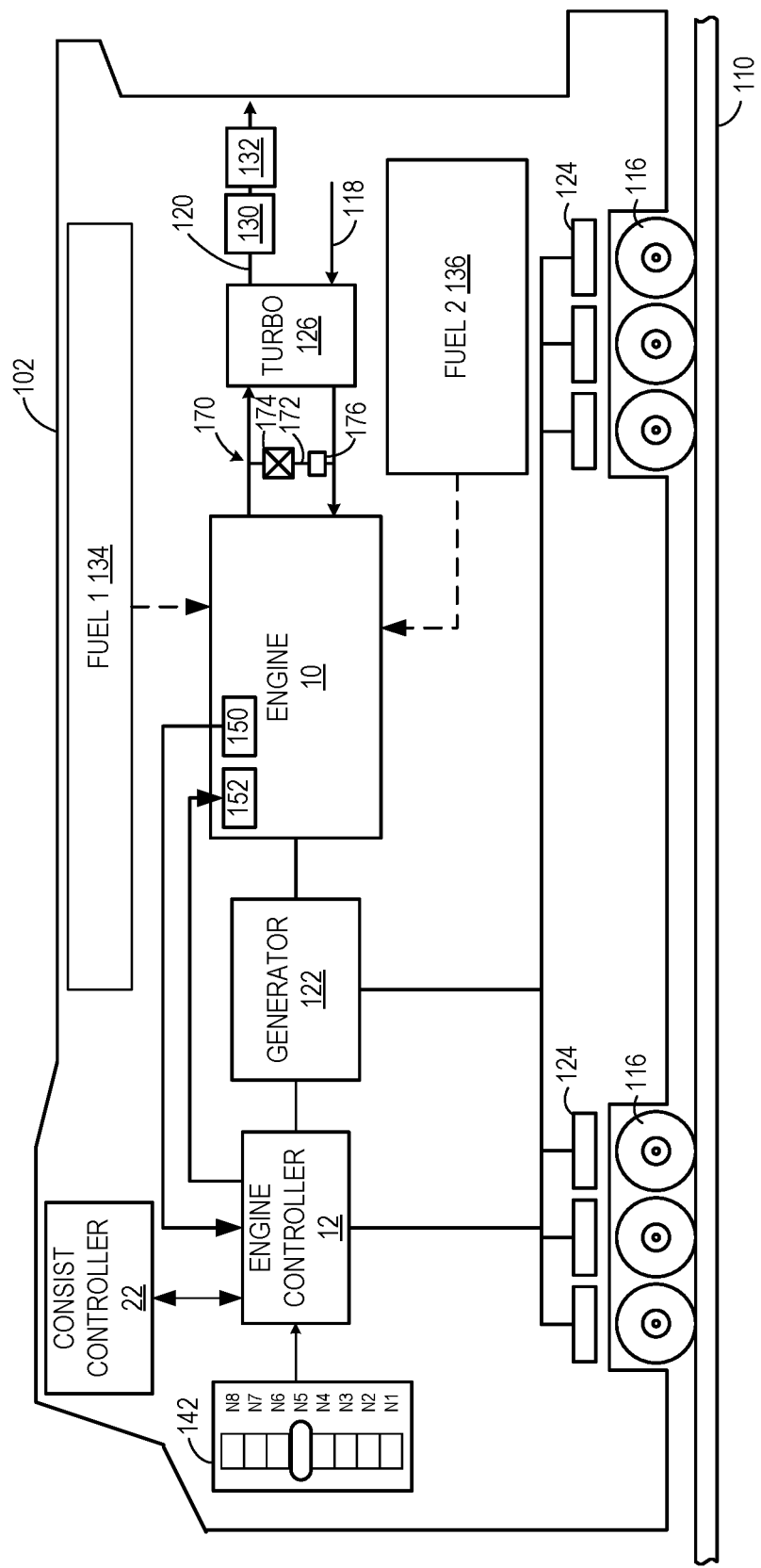
FIG. 2. shows a schematic diagram of an example embodiment of a locomotive from FIG. 1 with a dual fuel engine.
Figure 3:
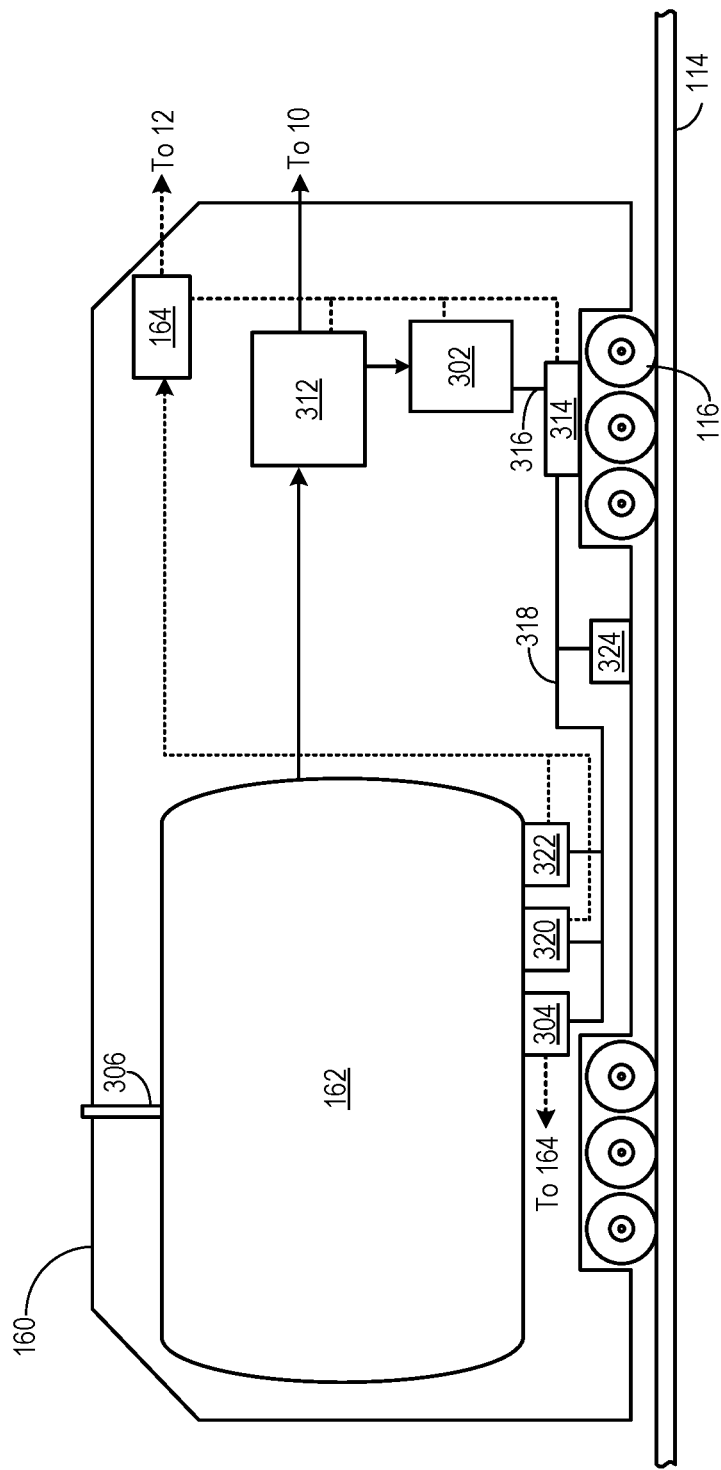
FIG. 3 shows an example embodiment of a fuel tender which may be included in the train of FIG. 1.

In one example, the fuel tender may be non-powered, e.g., without an engine or electric traction motors (e.g., electric traction motors 124 shown in FIG. 2). However, in other examples, the fuel tender may be powered for propulsion. For example, as shown in FIG. 3, the fuel tender may include an engine (e.g., engine 302), which may be similarly configured to the engines of the locomotives, or may have a different configuration. The engine of the fuel tender may combust the fuel stored in the fuel storage tank and/or fuel stored at another vehicle of the train.

The one or more fuel storage tanks of the fuel tender may have a suitable structure for storing a specific type of fuel. In one example, the fuel storage tank may be adapted for cryogenic storage of liquefied natural gas (LNG). As another example, the fuel storage tank may be used to store a fuel in a liquid state at ambient temperature and pressure, such as diesel or ammonia. In yet another example, the fuel storage tank may be configured to store a fuel as a compressed gas, such as hydrogen. In each instance, the fuel tender may be equipped with various mechanisms and devices for storage of the particular fuel. Further details of the fuel tender are shown further below, with reference to FIG. 3.

In some examples, fuel may be stored only at the fuel tender. In other examples, however, fuel may be stored both at the fuel tender and at one or more of the locomotives, e.g., as shown in FIG. 2. In addition, in some instances the fuel tender may also be configured to store a fuel cell system, including a fuel cell and one or more tanks of compressed hydrogen gas. Alternatively, the fuel cell system may be stored at one or more of the locomotives.

FIG. 2 depicts an example embodiment of a rail vehicle of the train from FIG. 1, herein depicted as the locomotive 102, configured to run on the track 110 via a plurality of wheels 116. Power for propulsion of the locomotive may supplied at least in part by the engine. The engine receives intake air for combustion from an intake passage 118. The intake passage receives ambient air from an air filter (not shown) that filters air from outside of the locomotive. Exhaust gas resulting from combustion in the engine is supplied to an exhaust passage 120. Exhaust gas flows through the exhaust passage, and out of an exhaust stack (not shown) of the locomotive.

In one embodiment, the engine operates as a compression ignition engine configured to combust at least one type of fuel. In another embodiment, the engine operates as a spark ignition engine similarly configured to combust at least one type of fuel. For example, the engine may combust one specific fuel type only or may be able to combust two or more types of fuel, e.g., a multi-fuel engine. As such, the different fuel types may be combusted individually or co-combusted, e.g., combusted concurrently, at the engine. In one embodiment, the multi-fuel engine may be a dual fuel engine, as depicted in FIG. 2, the dual fuel engine configured to receive a first fuel from a first fuel reservoir 134 and a second fuel from a second fuel reservoir 136.

While the locomotive is equipped with two fuel reservoirs in FIG. 2, in other examples, the locomotive may include only one fuel reservoir or no fuel reservoir. For example, at least one of the fuel reservoirs may be stored at the fuel tender, e.g., the fuel tender 160 of FIG. 1. Alternatively, a third fuel may be stored at the fuel tender in addition to the first fuel at the first fuel reservoir 134 and the second fuel at the second fuel reservoir 136 of the locomotive. In one example, fuels which may be stored at ambient pressure and temperature without any additional equipment or specialized storage tank configurations, such as diesel, may be stored at the locomotive. Fuels demanding specialized equipment, such as for cryogenic or high pressure storage, may be stored on-board the fuel tender. In other examples, however, the locomotive and the fuel tender may each store fuels that do not demand specialized equipment.

The first, second, and third fuels (e.g., any fuels stored on-board the train) may each be any of a number of different fuel types. For example, the types of fuel may include hydrocarbon-based fuels, such diesel, natural gas, methanol, ethanol, dimethyl ether (DME), etc. Alternatively, the fuels may be non-hydrocarbon-based fuels, such as hydrogen, ammonia, etc. The fuels listed above are non-limiting examples of fuels which may be combusted at the engine, and various other types of fuels are possible.

Additionally, each of the stored fuels may be a gaseous or a liquid phase fuel. Thus, when configured as a compression ignition engine combusting a single fuel type, the engine may consume a gaseous fuel or a liquid fuel. When the compression ignition engine is a multi-fuel engine, the engine may combust only liquid fuels, only gaseous fuels, or a combination of liquid and gaseous fuels. Similarly, when configured as a spark ignition engine combusting a single fuel type, the engine may also consume either a gaseous fuel or a liquid fuel. When configured as a multi-fuel spark ignition engine, the engine may combust only liquid fuels, only gaseous fuels, or a combination of liquid and gaseous fuels.

As either of the spark ignition or the compression ignition multi-fuel engine configurations, the engine may combust fuel combinations in different manners. For example, one fuel type may be a primary combustion fuel and another fuel type may be a secondary, additive fuel used under certain conditions to adjust combustion characteristics. For example, during engine startup, a fuel combustion mixture may include a smaller proportion of diesel to seed ignition while hydrogen may form a larger proportion of the mixture. In other examples, one fuel may be used for pilot injection prior to injection of the primary combustion fuel.

The engine, as the multi-fuel engine, may be configured to combust various combinations of the fuels and the fuels may be premixed or not premixed prior to combustion. In one example, the first fuel may be hydrogen and the second fuel may be diesel. In another example, the first fuel may be ammonia and the second fuel may be diesel. In yet another example, the first fuel may be ammonia and the second fuel may be ethanol. Further combinations are possible with storage of the third fuel on the fuel tender. For example, LNG may be stored at the fuel tender and the engine may be configured to combust LNG and hydrogen, or LNG, diesel, and hydrogen, or LNG, ammonia, and hydrogen. As such, numerous combinations of fuel types are possible, where the combinations may be determined based on compatibility of the fuels. A method of delivery of the fuels to the engine for combustion may similarly depend on properties of the fuel type.

When the engine is the single fuel-combusting engine (either spark ignition or compression ignition), the engine may consume a single liquid phase fuel. For example, the engine may combust diesel, hydrogen, ammonia, LNG, or another liquid phase fuel. Similarly, the engine may be configured to combust a single gaseous fuel, such as hydrogen, or another gaseous fuel.

Furthermore, a fuel that is stored on-board in one physical state, e.g., gas or liquid, may be delivered to the engine in the same state or a different state. For example, LNG may be stored cryogenically in the liquid phase but may undergo a transition to the gas phase, e.g., at a regasification unit in the fuel tender, prior to injection at the engine. Other fuels, however, may be stored as a liquid and injected as a liquid or stored as a gas and injected as a gas.

Fuels may be injected at the engine according to more than one injection technique, for example. In one example, one or more of the fuels may be delivered to the engine cylinders via an indirect injection method, such as port injection. In another example, at least one of the fuels may be introduced to the engine cylinders via direct injection. In yet another example, at least one of the fuels may be injected by central manifold injection. The engine may be configured to receive the fuels exclusively by indirect injection, exclusively by direct injection, or by a combination of indirect and direct injection. As one example, the fuels may be injected via port injection during low loads and by direct injection during high loads. In particular, when one of the fuels is a gaseous fuel, premixing of the gaseous fuel may be desirable via port injection. The fuels may also be premixed when introduced by central manifold injection. Premixing by direct injection is also possible, such as by injection of the gaseous fuel during an intake stroke of the engine cylinders.

Each type of injection may include injection of either gaseous or liquid phase fuels. However, some injection methods may be more suitable for certain fuels depending on specific properties of the fuel type. For example, hydrogen may be injected by port injection or direct injection. Liquid phase fuels, such as diesel, may be injected by direct injection. Ammonia and natural gas may each be injected by port injection or direct injection. Similarly, fuels such as methanol and ethanol may also be either port injected or direct injected. In some instances, the engine may be configured with fuel injectors capable of switching between injection of gaseous fuels and of liquid fuels.

The fuels combusted by the dual fuel engine, whether in the gas phase or liquid phase, may or may not be premixed prior to combustion according to the type of fuel. For example, depending on operating conditions, premixing of hydrogen, natural gas, ammonia, methanol, ethanol, and DME may be desirable. During other operating conditions, fuels such as diesel, hydrogen, natural gas, methanol, and ethanol may not be premixed. Premixing of the fuels may include port injection of at least one of the fuels into an inlet manifold or inlet port where the fuel may mix with air before entering a cylinder. As another example, each of the fuels may be port injected, allowing the fuels to mix with one another and with air prior to combustion. In other examples, the fuel(s) may be injected into a pre-combustion chamber fluidically coupled to a cylinder head where the fuel(s) may mix with air in the pre-combustion chamber before flowing to the cylinder head.

Alternatively, as described above, the fuels may be delivered to the engine cylinders by directly injecting one or more fuels into the engine cylinders when the cylinders are filled with at least the compressed air and, in some instances, the gas phase fuel. Direct injection may include high pressure direct injection (HPDI) and low pressure direct injection (LPDI). When direct injected, the fuels may not be premixed, in one example. However, in another example, premixing may be enabled by direct injection of one or more of the fuels prior to a compression stroke of the engine cylinders, as described above.

Furthermore, a type of gaseous fuel used may determine whether direct injection of the fuel may include HPDI or LPDI, or both HPDI and LPDI. For example, hydrogen, when stored as a compressed gas, may be injected by HPDI or by LPDI, depending on engine load and available delivery pressure. In particular, HPDI of hydrogen may alleviate knock due to continuous burning of the hydrogen as the hydrogen mixes in the engine cylinders. Furthermore, HPDI may enable greater substitution rates of hydrogen, e.g., substituting for diesel, for example, thereby decreasing hydrocarbon, NOx, and particulate matter emissions during engine operation.

An injection ratio of the fuels for co-combustion may vary according to operating conditions. For example, when the first fuel is hydrogen and the second fuel is diesel, a hydrogen-diesel ratio may be decreased in response to an increase in power demand at the engine. The adjusting of the ratio of diesel to hydrogen may be further based on a geographical location of the vehicle, and the fraction of the hydrogen injected may be increased in response to the geographical location of the vehicle being a green state.

As an example, while the engine is idling, during a first condition, only diesel may be injected to each cylinder of the engine and combustion may be carried out in each cylinder, and during a second condition, hydrogen may be injected in combination with diesel to a first set of cylinders of the engine and combustion may be carried out in only the first set of cylinders (skip fire for the remaining engine cylinders). The first condition may include one of an engine temperature being lower than a threshold temperature and a level of hydrogen in a fuel reservoir being lower than a threshold level, and the second condition may include each of the engine temperature being higher than the threshold temperature and the level of hydrogen in the fuel reservoir being higher than the threshold level. During the second condition, fueling and combustion may be suspended in all engine cylinders except the first set of cylinders. A number of cylinders in the first set of cylinders may be based on one or more of the engine load, the engine speed, the engine temperature. During the first condition, an amount of diesel injected to each cylinder in the engine may be lower than an amount of the combination of hydrogen and diesel injected to each cylinder in the first set of cylinders during the second condition. In this way, during the second condition, the air fuel ratio in each cylinder of the first set of cylinders may be decreased and engine efficiency may be improved. Cylinders selected to be in the first set of cylinders may be changed after every one or more engine cycles to include every cylinder in the first set over a number of engine cycles. Further details of using a combination of fuels during skip fire operation are provided below, with reference to FIG. 5.

As shown in FIG. 2, the engine is coupled to an electric power generation system, which includes an alternator/generator 122 and the electric traction motors. For example, the engine generates a torque output that is transmitted to the alternator/generator which is mechanically coupled to the engine. The alternator/generator produces electrical power that may be stored and applied for subsequent propagation to a variety of downstream electrical components. As an example, the alternator/generator may be electrically coupled to the electric traction motors and the alternator/generator may provide electrical power to the electric traction motors. As depicted, the electric traction motors are each connected to one of a plurality of wheels 116 to provide tractive power to propel the locomotive. One example locomotive configuration includes one traction motor per wheel. As depicted herein, six pairs of traction motors correspond to each of six pairs of wheels of the locomotive.

The locomotive may further include a turbocharger 126 arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown) which is at least partially driven by a turbine (not shown). While in this case a single turbocharger is included, the system may include multiple turbine and/or compressor stages. Further, in some embodiments, a wastegate may be provided which allows exhaust gas to bypass the turbocharger. The wastegate may be opened, for example, to divert the exhaust gas flow away from the turbine. In this manner, the rotating speed of the compressor, and thus the boost provided by the turbocharger to the engine may be regulated.

The locomotive further may include an exhaust gas recirculation (EGR) system 170, which routes exhaust gas from the exhaust passage upstream of the turbocharger to the intake passage downstream of the turbocharger. The EGR system includes an EGR passage 172 and an EGR valve 174 for controlling an amount of exhaust gas that is recirculated from the exhaust passage of the engine to the intake passage of the engine. By introducing exhaust gas to the engine, the amount of available oxygen for combustion is decreased, thereby reducing the combustion flame temperatures and reducing the formation of nitrogen oxides (e.g., NOx). The EGR valve may be an on/off valve controlled by the locomotive controller, or it may control a variable amount of EGR, for example.

The EGR system may further include an EGR cooler 176 to reduce the temperature of the exhaust gas before it enters the intake passage. As depicted in the non-limiting example embodiment of FIG. 2, the EGR system is a high-pressure EGR system. In other embodiments, the locomotive may additionally or alternatively include a low-pressure EGR system, routing EGR from a location downstream of the turbocharger to a location upstream of the turbocharger. As an example, as elaborated with relation to FIG. 4, the EGR system may be a donor cylinder EGR system where one or more cylinders provide exhaust gas only to the EGR passage, and then to the intake.

The locomotive includes an exhaust gas treatment system coupled in the exhaust passage to reduce regulated emissions. In one example embodiment, the exhaust gas treatment system may include a diesel oxidation catalyst (DOC) 130 and a diesel particulate filter (DPF) 132. The DOC may oxidize exhaust gas components, thereby decreasing carbon monoxide, hydrocarbons, and particulate matter emissions. The DPF is configured to trap particulates, also known as particulate matter (an example of which is soot), produced during combustion, and may be comprised of ceramic, silicon carbide, or any suitable material. In other embodiments, the exhaust gas treatment system may additionally include a selective catalytic reduction (SCR) catalyst, three-way catalyst, $NO_x$ trap, various other emission control devices or combinations thereof. In some embodiments, the exhaust gas treatment system may be positioned upstream of the turbocharger, while in other embodiments, the exhaust gas treatment system may be positioned downstream of the turbocharger.

The locomotive may further include a throttle 142 coupled to the engine to indicate power levels. In this embodiment, the throttle is depicted as a notch throttle. However, any suitable throttle is within the scope of this disclosure. Each notch of the notch throttle may correspond to a discrete power level. The power level indicates an amount of load, or engine output, placed on the locomotive and controls the speed at which the locomotive will travel. Although eight notch settings are depicted in the example embodiment of FIG. 2, in other embodiments, the throttle notch may have more than eight notches or less than eight notches, as well as notches for idle and dynamic brake modes. In some embodiments, the notch setting may be selected by a human operator of the locomotive. In other embodiments, the consist controller may determine a trip plan (e.g., a trip plan may be generated using trip optimization software, such as Trip Optimizer™ system available from Wabtec Corporation and/or a load distribution plan may be generated using consist optimization software such as Consist Manager™ available from Wabtec Corporation)

including notch settings based on engine and/or locomotive operating conditions, as will be explained in more detail below.

The engine controller may control various components related to the locomotive. As an example, various components of the locomotive may be coupled to the engine controller via a communication channel or data bus. In one example, the engine controller and the consist controller each include a computer control system. The engine controller and consist controller may additionally or alternatively include a memory holding non-transitory computer readable storage media (not shown) including code for enabling on-board monitoring and control of locomotive operation. The engine controller may be coupled to the consist controller, for example, via a digital communication channel or data bus.

Both the engine controller and the consist controller may receive information from a plurality of sensors and may send control signals to a plurality of actuators. The engine controller, while overseeing control and management of the locomotive, may be configured to receive signals from a variety of engine sensors 150, as further elaborated herein, in order to determine operating parameters and operating conditions, and correspondingly adjust various engine actuators 152 to control operation of the locomotive. For example, the engine controller may receive signals from various engine sensors including, but not limited to, engine speed, engine load, intake manifold air pressure, boost pressure, exhaust pressure, ambient pressure, ambient temperature, exhaust temperature, engine temperature, exhaust oxygen levels, etc. Correspondingly, the engine controller may control the locomotive by sending commands to various components such as the electric traction motors, the alternator/generator, cylinder valves, fuel injectors, the notch throttle, etc. Other actuators may be coupled to various locations in the locomotive.

The consist controller may include a communication portion operably coupled to a control signal portion. The communication portion may be configured to receive signals from locomotive sensors including locomotive position sensors (e.g., GPS device), environmental condition sensors (e.g., for sensing altitude, ambient humidity, temperature, and/or barometric pressure, or the like), locomotive coupler force sensors, track grade sensors, locomotive notch sensors, brake position sensors, etc. Various other sensors may be coupled to various locations in the locomotive. The control signal portion may generate control signals to trigger various locomotive actuators. Example locomotive actuators may include air brakes, brake air compressor, traction motors, etc. Other actuators may be coupled to various locations in the locomotive. The consist controller may receive inputs from the various locomotive sensors, process the data, and trigger the locomotive actuators in response to the processed input data based on instruction or code programmed therein corresponding to one or more routines. Further, the consist controller may receive engine data (as determined by the various engine sensors, such as an engine coolant temperature sensor) from the engine controller, process the engine data, determine engine actuator settings, and transfer (e.g., download) instructions or code for triggering the engine actuators based on routines performed by the consist controller back to the engine controller.

For example, the consist controller may determine a trip plan to distribute load amongst all locomotives in the train, based on operating conditions. In some conditions, the consist controller may distribute the load unequally, that is, some locomotives may be operated at a higher power setting, or higher notch throttle setting, than other locomotives. The load distribution may be based on a plurality of factors, such as fuel economy, coupling forces, tunneling operating, grade, etc. In one example, the load distribution may be adapted based on a distribution of the locomotive consist, e.g., a positioning of each of the locomotives of the locomotive consist, across the train. For example, at least one locomotive may be positioned at an end of the train and at least one locomotive may be positioned at a front of the train. The locomotive at the end of the train may be configured to push the train and the locomotive at the front of the train may be configured to pull the train, particularly during uphill navigation. As such, a greater load may be placed on the pushing locomotive at the end of the train.

Turning now to FIG. 3, an embodiment of the fuel tender 160 of FIG. 1 is shown. As described above, the fuel tender includes the fuel storage tank 162, the controller 164, and the engine 302. The fuel tender may further include a first unit 304, which may be a device for controlling a temperature and pressure within the fuel storage tank. For example, when LNG is stored in the fuel storage tank, the first unit may be a cryogenic unit. The fuel storage tank may have various sizes and configurations, may be removable from the fuel tender, and may be configured to receive fuel from an external refueling station via port 306.

The fuel storage tank may supply fuel to a fuel modification unit 312. The fuel modification unit may be configured to adjust a characteristic of the fuel. For example, the fuel may be converted from a liquid phase to a gas phase at the fuel modification unit, such as when the fuel is LNG. As another example, the fuel modification unit may be a pump to adjust a delivery pressure of the fuel when the fuel is stored in the gas phase. In other examples, where fuel modification is not demanded, the fuel modification unit may be omitted. The fuel may be delivered from the fuel modification unit to engines of the locomotives (e.g., the engines 10 of FIGS. 1 and 2).

By supplying fuel from the fuel storage tank to the locomotive engines and the engine of the fuel tender, the fuel may be combusted by the engines distributed across the train. In another non-limiting embodiment, the fuel tender engine may be further configured to generate electricity that may be delivered to one or more components on-board the fuel tender and/or on-board the locomotives. In one example, as depicted in FIG. 3, the fuel tender engine may generate torque that is transmitted to a power conversion unit 314 via drive shaft 316. The power conversion unit is configured to convert the torque into electrical energy that is delivered via electrical bus 318 to a variety of downstream electrical components in the fuel tender. Such components may include, but are not limited to, the first unit, the fuel modification unit, the controller, a pressure sensor 320, a temperature sensor 322, batteries 324, various valves, flow meters, additional temperature and pressure sensors, compressors, blowers, radiators, batteries, lights, on-board monitoring systems, displays, climate controls, and the like, some of which are not illustrated in FIG. 3 for brevity. Additionally, electrical energy from the electrical bus may be provided to one or more components of the locomotives.

In one example the power conversion unit includes an alternator (not shown) that is connected in series to one or more rectifiers (not shown) that convert the alternator's AC electrical output to DC electrical power prior to transmission along the electrical bus. Based on the configuration of a downstream electrical component receiving power from the electrical bus, one or more inverters may be configured to invert the electrical power from the electrical bus prior to supplying electrical power to the downstream component. In one example, a single inverter may supply AC electrical power from a DC electrical bus to a plurality of components. In another non-limiting embodiment, each of a plurality of distinct inverters may supply electrical power to a distinct component.

The controller on-board the fuel tender may control various components on-board the fuel tender, such as the fuel modification unit, the fuel tender engine, the power conversion unit, the first unit, control valves, and/or other components on-board the fuel tender, by sending commands to such components. The controller may also monitor fuel tender operating parameters in active operation, idle and shutdown states. Such parameters may include, but are not limited to, the pressure and temperature of the fuel storage tank, a pressure and temperature of the fuel modification unit, the fuel tender engine temperature, pressure, and load, compressor pressure, heating fluid temperature and pressure, ambient air temperature, and the like. In one example, computer readable storage media configured in the fuel tender controller may execute code to auto-stop, auto-start, operate and/or tune the engine and the fuel modification unit in response to one or more control system routines. The computer readable storage media may also execute code to transmit to and receive communications from the engine controllers on-board the locomotives.

The fuel tender depicted in FIG. 3 is a non-limiting example of how the fuel tender may be configured. In other examples, the fuel tender may include additional or alternative components. As an example, the fuel tender may further include one or more additional sensors, flow meters, control valves, various other device and mechanisms for controlling fuel delivery and storage conditions, etc.

Figure 4:
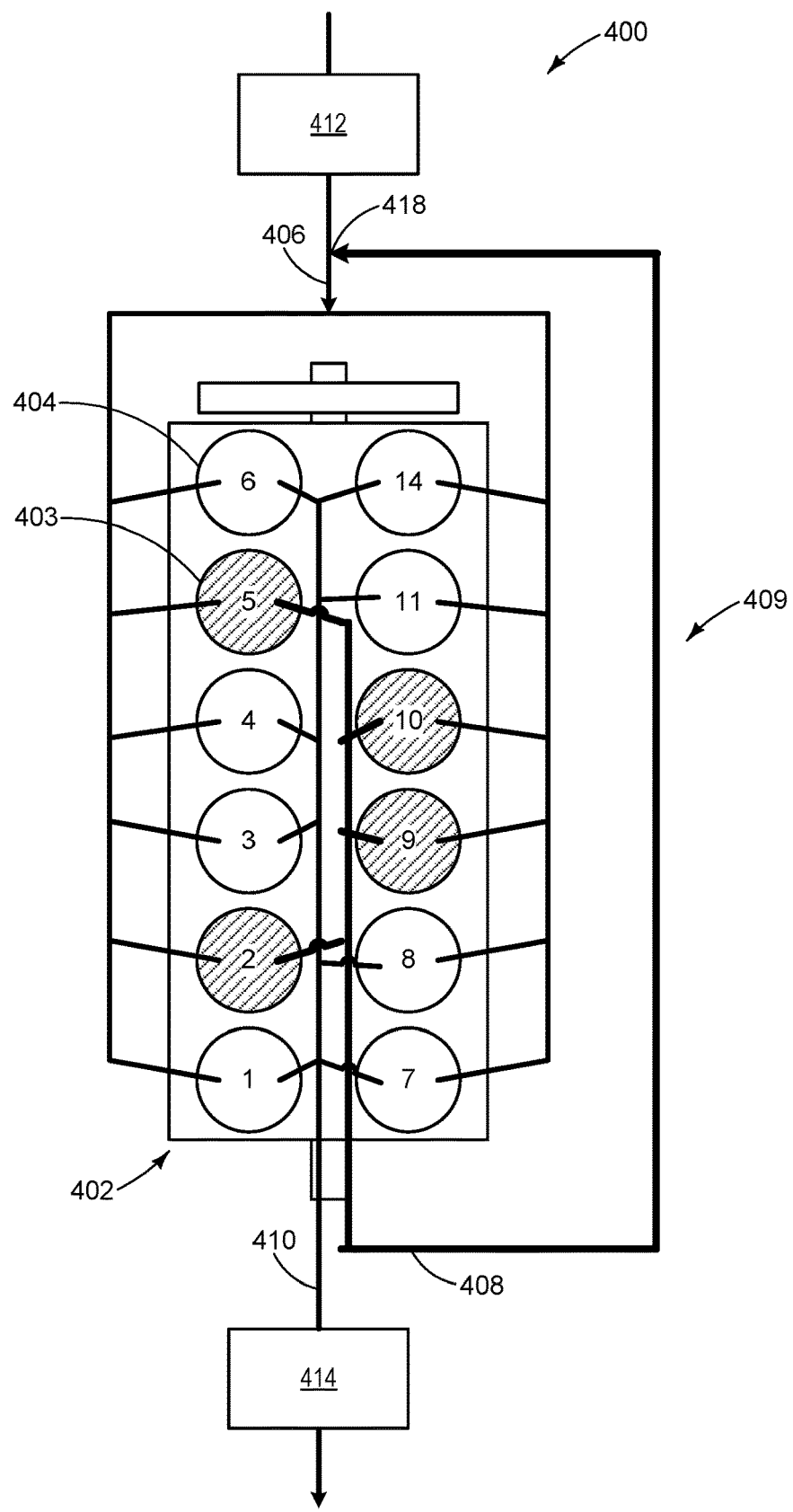
FIG. 4 shows a schematic diagram of an example embodiment of an engine with a plurality of donor cylinders and a plurality of non-donor cylinders.

FIG. 4 shows an example embodiment of a system 400 with an engine 402, such as engine 10 described above with reference to FIG. 2, having a plurality of donor cylinders 403 which supply exhaust gas recirculation (EGR) to the intake manifold and a plurality of non-donor cylinders 404 from which exhaust is directly routed to a turbine. In the example embodiment of FIG. 4, the engine is a V-12 engine having twelve cylinders. In other examples, the engine may be a V-6, V-8, V-10, V-16, 1-4, 1-6, 1-8, opposed 4, or another engine type.

In the example embodiment of FIG. 4, the donor cylinders are depicted as a first group of cylinders comprising four cylinders (e.g., cylinders labeled 2, 5, 9, and 10). The non-donor cylinders are depicted as a second group of cylinders comprising eight cylinders (e.g., cylinders labeled 1, 3, 4, 6, 7, 8, 11, and 12). In other embodiments, the engine may include at least one donor cylinder and at least one non-donor cylinder. For example, the engine may have six donor cylinders and six non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

The donor cylinders are coupled to a first exhaust manifold 408 which is part of an EGR system 409. The first exhaust manifold is coupled to the exhaust ports of the donor-cylinders. As such, in the present example, the donor cylinders are coupled exclusively to the first exhaust manifold. Exhaust gas from each of the donor cylinders is routed through the EGR system to an exhaust gas inlet 418 in an intake passage 406.

The non-donor cylinders are coupled to a second exhaust manifold 410. The second exhaust manifold is coupled to the exhaust ports of at least the non-donor-cylinders, but, in some examples, may be coupled to exhaust ports of the donor cylinders. For example, exhaust gas from one or more of the donor cylinders may be directed to the second exhaust manifold via a valve such that the amount of EGR may be reduced as desired, for example, during selected operating conditions. In the present example, the non-donor cylinders are coupled exclusively to the second exhaust manifold. Exhaust gas from the non-donor cylinders flows to an exhaust system. The exhaust system may include exhaust gas treatment devices, elements, and components, for example, a diesel oxidation catalyst, a particulate matter trap, hydrocarbon trap, an SCR catalyst, etc., as described above. Further, in the present example, exhaust gas from the non-donor cylinders drives a turbine 414 of a turbocharger.

In embodiments in which the engine is a V-engine, the exhaust manifolds may be inboard exhaust manifolds. For example, the exhaust ports of each of the cylinders are lined up on the inside of the V-shape. In other embodiments, the exhaust manifolds may be outboard exhaust manifolds. For example, the exhaust ports of each of the cylinders are lined up on the outside of the V-shape.

As depicted in FIG. 4, the engine is configured with a turbocharger (such as turbocharger 126 in FIG. 2) including the exhaust turbine arranged along the second exhaust manifold, and a compressor arranged in the intake passage. The compressor may be at least partially powered by the exhaust turbine via a shaft (not shown). The exhaust gas inlet is downstream of the compressor in the intake passage. The turbocharger increases air charge of ambient air drawn into the intake passage in order to provide greater charge density during combustion to increase power output and/or engine-operating efficiency. While in this case a single turbocharger is included, the system may include multiple turbine and/or compressor stages.

In a V-12 engine, such as depicted in FIG. 4, the engine may have a cylinder firing order such as 1-7-5-11-3-9-6-12-2-8-4-10, for example, in which cylinder 1 fires first, cylinder 7 fires second, cylinder 5 fires third, and so on. In other examples, the cylinders may have a different firing order. During normal, non-skip fire conditions, each cylinder is fired once every engine cycle, or once every 720 crankshaft degrees, according to the cylinder firing order. In the embodiment depicted in FIG. 4, the engine comprises four donor cylinders, and thus in non-skip fire conditions, four out of twelve fired cylinders are donor cylinders. As a result, approximately 33% of the gasses inducted into the cylinders may derive from the donor cylinders.

During non-preferential skip fire operation, such as a lower than threshold EGR demand, a subset of the donor and non-donor cylinders are fired each engine cycle. The number of cylinders fired each cycle may be selected based on operating conditions such as fuel demand. The cylinders in each subset may change each engine cycle such that every cylinder is skipped at least once within a predetermined number of engine cycles. Further, within the predetermined number of engine cycles, every cylinder, including both donor and non-donor cylinders, is fired the same amount of times.

During preferential donor cylinder skip fire conditions, such as during a higher than threshold EGR demand, the donor cylinders may comprise a different proportion of the fired cylinders. For example, during a preferential skip fire routine wherein the donor cylinders are preferentially fired, the donor cylinders may comprise four out of nine fired cylinders, or four out of six fired cylinders, or in some embodiments, the donor cylinders may be the only cylinders fired. Any proportion of donor cylinders fired is within the scope of this disclosure. The proportion of donor cylinders fired may be selected based upon a desired effective EGR rate to reduce NOx levels.

In this way, the components described in FIGS. 1-4 enable a controller storing instructions in non-transitory memory that, when executed, cause the controller to: during one of an engine load being lower than a threshold load and an engine speed being lower than or equal to an idling speed, selectively inject a combination of a gaseous fuel and a liquid fuel to a subset of engine cylinders, and combust the combination of the gaseous fuel and the liquid fuel while skipping fuel injection and combustion in remaining engine cylinders.

Figure 5:
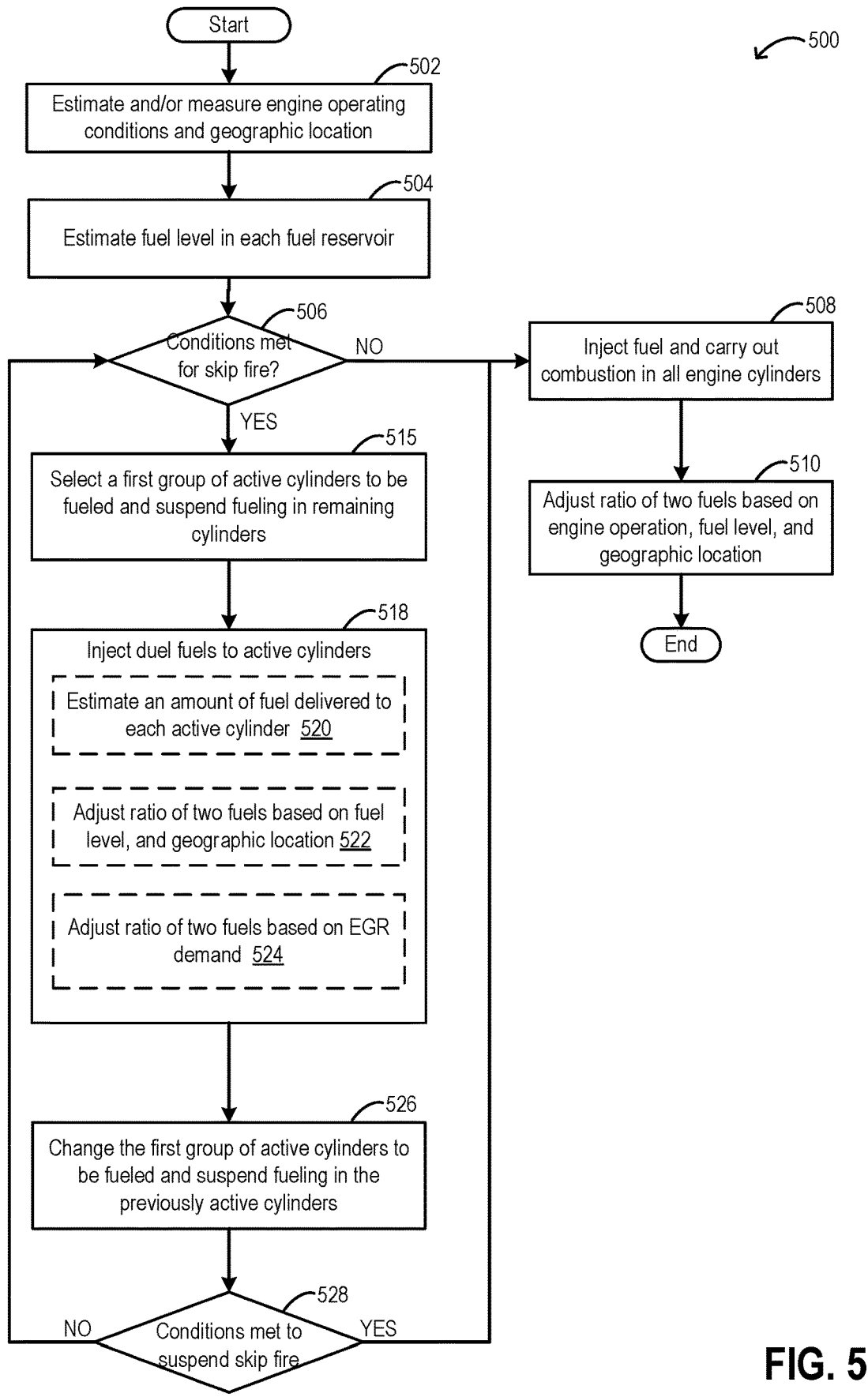
FIG. 5 shows a flow-chart illustrating an example routine for using hydrogen as one of the fuels during skip fire operation of an engine.

FIG. 5 a flow chart depicts a routine 500 for using hydrogen as one of the fuels during skip fire operation of an engine in a vehicle (such as locomotive 102 in FIG. 2). Routine 500 may be carried out by controller 12 of engine 10 in FIG. 2, for example. During skip fire operation of the engine, one or more engine cylinders may be maintained active wherein fuel is injected and combustion is carried out while suspending fueling and combustion in all other engine cylinders.

At step 502, engine operating conditions and geographical location of the vehicle may be estimated. As an example, the engine operating conditions may include engine speed, engine temperature, engine load, torque demand, boost demand, engine dilution demand, etc. The geographical location of the vehicle may be obtained from an on-board navigational system. In one example, the controller on-board the vehicle may include a navigation system (e.g., global positioning system, GPS) via which a location of the vehicle (e.g., GPS co-ordinates of the vehicle) may be retrieved. In another example, the location of the vehicle may be retrieved from an external network communicatively coupled to the vehicle. The geographical location of the vehicle may correspond to a regulation regarding carbon footprint from the vehicle operation at that location.

At step 504, a level of fuel in each fuel reservoir may be estimated. As an example, fuel contained in a first fuel reservoir may be diesel while the fuel contained in the second fuel reservoir may be hydrogen. Hydrogen may burn effectively at lean conditions without producing carbon dioxide as the product of combustion, thereby reducing emission of greenhouse gases. A level of diesel and hydrogen in the respective reservoirs may be estimated.

At step 506, the routine includes determining if conditions are met for skip fire operation of the engine. Conditions for operating the engine with skip fire may be based on one or a combination of various engine operating parameters. These conditions may include engine speed, fuel demand, and engine load being below predetermined respective thresholds. For example, during idle mode, engine speed may be low, such as 250 RPM, and an operator may be requesting a low load setting (e.g., idle notch). Thus, fuel demand, which is based on speed, load, and operating conditions such as engine temperature, manifold pressure, etc., may be too low, for example less than 180 mm$^3$ fuel per cylinder, to accurately deliver the desired amount of fuel. Additionally, skip fire operation may mitigate problems with cold engine operation, and as such, skip fire on conditions may be based on engine temperature. Skip fire on conditions may further be based on the controller sensing the engine is in a steady state operating condition, as transient operating conditions may require a fluctuating fuel demand. Steady state operating conditions may be determined by an amount of time spent at current throttle position, or any suitable method.

If skip fire on conditions are not met, at step 508, fuel injection and combustion may be carried out in all engine cylinders. In one example, a mixture of hydrogen and diesel may be injected to each cylinder. By including diesel, auto ignition of the fuel mixture may be attained. In another example, natural gas may be used along with hydrogen and the mixture may be spark ignited in the cylinder. The two fuels may be pre-mixed and then delivered to each cylinder or the fuels may be separately, directly injected to the cylinder. As an example, hydrogen and natural gas may be port injected or direct injected. Diesel may be direct injected near top dead center to initiate combustion.

At step 510, a ratio of two fuels (such as hydrogen and diesel/natural gas) may be adjusted based on engine operation, fuel level for each fuel, and geographical location. As an example, a higher percentage of hydrogen may be used during lower load conditions and higher temperature conditions. Also, due to flammability of hydrogen, a higher concentration of hydrogen may burn optimally even at a high AFR. In one example, the ratio between the two fuels may be adjusted differently for donor and non-donor cylinders. In one example, a percentage of hydrogen injected to the donor cylinders may be increased if EGR is being supplied and it is desired to route unburnt fuel to the intake manifold. In another example, a percentage of hydrogen injected to the donor cylinders may be decreased if it is desired to reduce unburnt fuel in the EGR supplied to the intake manifold. In certain geographical locations such as green states (e.g. California), in future, there may be regulations governing release of greenhouse gases, and a higher percentage of hydrogen may be used to reduce carbon emissions. Green states may be defined as states or regions where regulations by governing agencies are stricter for green house emissions and a lower level of emissions is need to be maintained relative to other states or regions.

Returning to step 506, if it is determined that conditions are met for skip fire operation of the engine, at step 514, a first group of cylinders may be selected to be fueled and combustion may be suspended in the remaining engine cylinders. Determining a number of cylinders to skip may be based on fuel demand. For example, during low-load engine mode, a fuel injection amount to each cylinder may be too small to be accurately delivered, and thus a number of cylinders to skip may be chosen to increase the fuel injection to the fired cylinders to an amount that can be delivered accurately. The first group may be chosen based on fuel demand, and may be distributed in such a manner to equally balance cylinder firing across multiple engine cycles. For example, the engine may be a 12 cylinder engine with a firing order of 1-7-5-11-3-9-6-12-2-8-4-10. If six cylinders are fired, the method may fire cylinders 1-5-3-6-2-4 in the subset of engine cycle N and fire cylinders 7-11-9-12-8-10 in the subset of engine cycle N+1. In this way, each cylinder is fired once every two engine cycles. However, any suitable skip fire order is within the scope of this disclosure.

For engines including donor and non-donor cylinders, the selection of cylinders to be fueled and fired may be based on EGR demand. During higher EGR demand, the non-donor cylinders may be skipped while fueling and combustion may be continued in the donor cylinders.

At 518, dual fuels such as hydrogen and diesel/natural gas may be injected to the active cylinders while fuel injection is suspended in the skip fired cylinders. In one example, a mixture of hydrogen and diesel may be injected to each active cylinder. By including diesel, auto ignition of the fuel mixture may be attained. In another example, when natural gas is injected along with hydrogen, the mixture may be spark ignited in the cylinder. The two fuels may be premixed and then delivered to each cylinder or the fuels may be separately, directly injected to the cylinder.

Injecting dual fuels to the active cylinders may include, at step 520, estimating an amount of fuel to be delivered to each cylinder and then delivering the estimated amount of fuel. The total amount of fuel to be injected for each engine cycle may be based on engine operating conditions including engine load, torque demand, engine speed and engine temperature. The total amount of fuel may then be equally divided among the active cylinders. By reducing the number of cylinders to be fueled, the amount of fuel injected to each active cylinder may be increased, thereby improving fuel spray development and combustion even during lean operation. Fuel injection amounts to each fired cylinder may be determined based on fuel demand and the number of fired cylinders. For example, if six out of twelve cylinders were selected to be skipped, the amount of fuel needed to meet desired fuel demand would be distributed to the remaining six cylinders, and thus each fired cylinder would receive twice the amount of injected fuel than if all cylinders were fired.

Injecting dual fuels to the active cylinders may also include, at step 522, adjusting a ratio of the two fuels (such as hydrogen and diesel/natural gas) based on engine operation, fuel level for each fuel, and geographical location. In absence of hydrogen, such as if the engine was fueled using diesel as the first fuel along with a different second fuel, at low load conditions such as during idling, diesel may be solely injected to the active cylinders. However, with the availability of hydrogen, it is possible to use hydrogen at least as a portion of the total amount of fuel injected, thereby reducing carbon emissions. Further, by increasing the use of hydrogen, carbon deposit on engine components including engine valves and the exhaust passage may be reduced.

In one example, during lower engine temperatures, a higher amount of hydrogen may be used relative to diesel while during higher engine temperatures, a lower amount of hydrogen may be used relative to diesel. As an example, a higher percentage of hydrogen may be used during lower load conditions and higher temperature conditions. Also, as previously mentioned, during vehicle operation in green states (e.g. California), a higher percentage of hydrogen may be used to reduce carbon emissions. In one example, the fuel injected may include 70% hydrogen and 30% diesel.

Injecting dual fuels to the active cylinders include, at step 524, adjusting a ratio of the two fuels based on EGR demand. In one example, the ratio between the two fuels may be adjusted differently for donor and non-donor cylinders. In one example, a percentage of hydrogen injected to the donor cylinders may be increased if EGR is being supplied and it is desired to route unburnt fuel to the intake manifold. In another example, a percentage of hydrogen injected to the donor cylinders may be decreased if it is desired to reduce unburnt fuel in the EGR supplied to the intake manifold. Further, during certain engine operating conditions with increased propensity for knock, such as higher engine temperature or engine load approaching a limit of the skip fire operation, the non-donor cylinders may be fueled with a mixture of the two fuels over the donor cylinders since the donors cylinders may have a higher propensity of knock due to increased back pressure.

As an example, during conditions when hydrogen is not used as fuel, and skip fire operation is carried out only with diesel as fuel being injected to the active cylinders, the donor and non-donor cylinders may be equally skipped.

At step 526, the first group of cylinders that is fueled is changed and fueling may be suspended in one or more previously fueled cylinders. As an example, the cylinders that were not combusting during the previously one or more engine cycles may be selected as active cylinders which are then fueled and combustion is carried out while fueling and combustion may be suspended in the one or more previously active cylinders. As an example, if one cylinder bank is active at a time, switching between cylinder banks may take place every 30 secs or each time the engine satisfies the skip-fire conditions. The total number of active cylinders may be continued to be adjusted based on engine operating conditions and which cylinders are active cylinders are changed after one or more engine cycles to ensure that all cylinders are operated for sustainably equal number of engine cycles. By altering the skip-fired cylinders and rotating around the engine, all the cylinders would stay warm and undergo similar wear on components like fuel injectors.

At step 528, the routine includes determining if conditions are met to end skip fire operation of the engine. At the end of skip fire operation, all engine cylinders may be fueled and combustion may be carried out in all cylinders. Once a skip fire routine is initiated, a predetermined period of time (e.g. one engine cycle) may elapse after which routine 500 may determine whether the conditions for skip fire on are still met, or whether conditions for skip fire end are met. Skip fire end conditions may be based on one or more of engine speed, fuel demand, and engine load being above predetermined respective thresholds (e.g. engine operating in a middle or high-load mode), engine temperature, and transient engine operating conditions. If it is determined that skip fire off conditions are met, the routine may proceed to step 508 wherein fuel may be injected and combustion may be carried out in all engine cylinders.

In this way, a skip fire protocol may be performed whereby some cylinders are skipped each cycle. The remaining cylinders may receive an increased amount of fuel to increase the accuracy of fuel delivery. Each engine cycle, the cylinders that are skipped alternate in order to equally distribute the thermal load across all cylinders. Thus, across a predetermined number of engine cycles, every cylinder will be skipped equally.

In this way, by skipping combustion in one or more cylinders of a lean burn engine during low load or idling conditions, AFR in the active cylinders may be reduced and the fuel burning may be improved. By decreasing the AFR, the fuel spray may be better developed within the cylinder. The technical effect of using hydrogen along with diesel during the skip fire operation to fuel the active cylinders is that due to the higher flammability of hydrogen, the fuel mixture may burn more effectively in the active cylinders, thereby improving engine performance. By continuing to use hydrogen during skip fire operation, the carbon deposition on engine components such as valves and exhaust may be reduced.

As used herein, an element or step recited in the singular and proceeded with the word "a" or "an" do not exclude plural of said elements or steps, unless such exclusion is indicated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

As used herein, the term "approximately" is means plus or minus five percent of a given value or range unless otherwise indicated.

An example method for an engine in a vehicle comprises: injecting a combination of two fuels to a first set of cylinders of the engine while disabling fuel injection to all remaining cylinders of the engine. In any of the preceding examples, additionally or optionally, the two fuels include diesel and hydrogen, the combination of fuels ignited via compression ignition. In any or all of the preceding examples, additionally or optionally, the method further comprises adjusting a ratio of hydrogen to diesel based on one or more of an engine load, an engine speed, an engine temperature, and an engine dilution demand. In any or all of the preceding examples, additionally or optionally, a fraction of the hydrogen injected is increased with an increase in one or more of the engine temperature, the engine load, and the engine dilution demand, and a fraction of diesel injected is increased with an increase in engine torque demand. In any or all of the preceding examples, additionally or optionally, the adjusting the ratio of diesel to hydrogen is further based on a geographical location of the vehicle. In any or all of the preceding examples, additionally or optionally, a number of cylinders in the first set of cylinders is selected based on one or more of the engine load, the engine speed, the engine temperature, and the engine dilution demand, the number of cylinders in the first set decreased with a decrease in one or more of the engine load, the engine speed, and the engine temperature. In any or all of the preceding examples, additionally or optionally, the engine includes a first group of donor cylinders selectively supplying exhaust gas to an exhaust gas recirculation (EGR) passage connecting respective exhaust passages of the donor cylinders to an intake passage, and a second group of non-donor cylinders supplying exhaust gas to an exhaust turbine. In any or all of the preceding examples, additionally or optionally, the number of cylinders in the first set of cylinders includes each of the donor cylinders during a higher than threshold engine dilution demand. In any or all of the preceding examples, additionally or optionally, during the injecting the combination of two fuels to the first set of cylinders of the engine, the two fuels are premixed prior to the injection of the combination to each cylinder in the first set of cylinders. In any or all of the preceding examples, additionally or optionally, during the injecting the combination of two fuels to the first set of cylinders of the engine, one or each of the two fuels are separately direct injected to each cylinder in the first set of cylinders. In any or all of the preceding examples, additionally or optionally, the injecting the combination of two fuels to the first set of cylinders of the engine is in response to one of a lower than threshold engine load, an engine idling, and a lower than threshold engine fueling demand.

Another example method for an engine in a vehicle, comprises: while the engine is idling, during a first condition, injecting only diesel to each cylinder of the engine and carrying out combustion in each cylinder, and during a second condition, injecting hydrogen in combination with diesel to a first set of cylinders of the engine and carrying out combustion in only the first set of cylinders. In any of the preceding examples, additionally or optionally, the first condition includes one of an engine temperature being lower than a threshold temperature and a level of hydrogen in a fuel reservoir being lower than a threshold level, and wherein the second condition includes each of the engine temperature being higher than the threshold temperature and the level of hydrogen in the fuel reservoir being higher than the threshold level. In any or all of the preceding examples, additionally or optionally, the second condition includes the vehicle operating in a geographical location with a regulation for emissions levels being lower than a threshold level, the geographical location estimated via an on-board navigation system. In any or all of the preceding examples, additionally or optionally, during the second condition, fueling and combustion are suspended in all engine cylinders except the first set of cylinders, and wherein a number of cylinders in the first set of cylinders is based on one or more of an engine load, an engine speed, and an engine temperature. Any or all of the preceding examples, additionally or optionally, during the second condition, adjusting a ratio of hydrogen to diesel based on one or more of torque demand, the engine speed, the engine temperature, and the level of hydrogen in the fuel reservoir. In any or all of the preceding examples, additionally or optionally, cylinders selected to be in the first set of cylinders are changed after every one or more engine cycles to include every cylinder in the first set over a number of engine cycles. In any or all of the preceding examples, additionally or optionally, during the first condition, an amount of fuel injected to each cylinder in the engine is lower than an amount of the fuel injected to each cylinder in the first set of cylinders during the second condition, the fuel injected to each cylinder during the first condition being diesel, and the fuel delivered to the first set of cylinders during the second condition being the combination of hydrogen and diesel.

Yet another example for an engine in a vehicle, comprises: a controller storing instructions in non-transitory memory that, when executed, cause the controller to: during one of an engine load being lower than a threshold load and an engine speed being lower than or equal to an idling speed, selectively injecting a combination of a gaseous fuel and a liquid fuel to a subset of engine cylinders, and combusting the combination of the gaseous fuel and the liquid fuel, and skipping fuel injection and combustion in remaining engine cylinders. In any of the preceding examples, additionally or optionally, the gaseous fuel is hydrogen, and wherein the liquid fuel is one of diesel and ammonia.

The invention claimed is:

1. A method for an engine in a vehicle, comprising:
in response to a first condition of low-load and high air-fuel ratio (AFR), injecting fuel to a first set of cylinders of the engine while disabling fuel injection to all remaining cylinders of the engine to decrease the AFR in the first set of cylinders, and increasing a ratio of hydrogen to diesel in the fuel injection.

2. The method of claim 1, further comprising adjusting a ratio of hydrogen to diesel based on one or more of an engine load, an engine speed, an engine temperature, and an engine dilution demand.

3. The method of claim 2, wherein a fraction of the hydrogen injected is increased with an increase in one or more of the engine temperature, the engine load, and the engine dilution demand, and a fraction of diesel injected is increased with an increase in engine torque demand.

4. The method of claim 3, wherein the adjusting the ratio of diesel to hydrogen is further based on a geographical location of the vehicle.

5. The method of claim 2, wherein a number of cylinders in the first set of cylinders is selected based on one or more of the engine load, the engine speed, the engine temperature, and the engine dilution demand, the number of cylinders in the first set decreased with a decrease in one or more of the engine load, the engine speed, and the engine temperature.

6. The method of claim 1, wherein the first set of cylinders comprises a ratio of exhaust gas recirculation (EGR) donor cylinders and non-donor cylinders in a first cycle, then firing a second different set of cylinders comprising the same ratio in a second cycle.

7. The method of claim 1, wherein, during the injecting the combination of two fuels to the first set of cylinders of the engine, the two fuels are premixed prior to the injection of the combination to each cylinder in the first set of cylinders.

8. A method for an engine in a vehicle, comprising:
during a first condition, injecting only diesel to each cylinder of the engine and carrying out combustion in each cylinder; and
during a second condition, in response to a low-load, high air-fuel ratio (AFR), injecting fuel to a first set of cylinders of the engine and carrying out combustion in the first set of cylinders but not a second set of cylinder to decrease the AFR, and increasing a ratio of hydrogen to diesel in the fuel injection.

9. The method of claim 8, wherein the first condition includes one of an engine temperature being lower than a threshold temperature and a level of hydrogen in a fuel reservoir being lower than a threshold level, and wherein the second condition includes each of the engine temperature being higher than the threshold temperature and the level of hydrogen in the fuel reservoir being higher than the threshold level.

10. The method of claim 8, wherein the second condition includes the vehicle operating in a geographical location with a regulation for emissions levels being lower than a threshold level, the geographical location estimated via an on-board navigation system.

11. The method of claim 9, wherein, during the second condition, fueling and combustion are suspended in all engine cylinders except the first set of cylinders, and wherein a number of cylinders in the first set of cylinders is based on one or more of an engine load, an engine speed, and an engine temperature.

12. The method of claim 11, further comprising, during the second condition, adjusting a ratio of hydrogen to diesel based on one or more of torque demand, the engine speed, the engine temperature, and the level of hydrogen in the fuel reservoir.

13. The method of claim 8, wherein cylinders selected to be in the first set of cylinders are changed after every one or more engine cycles to include every cylinder in the first set over a number of engine cycles.

14. The method of claim 8, wherein, during the first condition, an amount of fuel injected to each cylinder in the engine is lower than an amount of the fuel injected to each cylinder in the first set of cylinders during the second condition, the fuel injected to each cylinder during the first condition being diesel, and the fuel delivered to the first set of cylinders during the second condition being the combination of hydrogen and diesel.

15. A system for an engine in a vehicle, comprising:
a controller storing instructions in non-transitory memory that, when executed, cause the controller to:
during a first condition of one of an engine load being lower than a threshold load and an engine speed being lower than or equal to an idling speed and high air-fuel ratio (AFR),
selectively injecting and combusting a combination of hydrogen and diesel in a subset of engine cylinders, and increasing a ratio of hydrogen to diesel in the injection relative to a second condition; and
skipping fuel injection and combustion in remaining engine cylinders to decrease the AFR in the subset of cylinders.

16. The system of claim 15, wherein the gaseous fuel is hydrogen, and wherein the liquid fuel is one of diesel and ammonia.

17. The method of claim 1, wherein an amount of fuel injected into each of the first set of cylinders during the first condition is higher than an amount of fuel injected into each of the first set of cylinders during a second conditions when all cylinders are injected with fuel.

18. The method of claim 6, wherein the ratio of donor cylinders to non-donor cylinders is increased to reduce NOx levels.

19. The method of claim 8, wherein the AFR is reduced by an amount of fuel injected per cylinder being higher in the second condition than in the first condition.

20. The method of claim 8, wherein a number of cylinders in the first set is determined based a total amount of fuel required for an engine load and an amount of fuel that can be accurately delivered per cylinder.

* * * * *